United States Patent
Josten et al.

(10) Patent No.: US 7,552,147 B2
(45) Date of Patent: Jun. 23, 2009

(54) SYSTEM AND METHOD FOR MINIMIZING DATA OUTAGE TIME AND DATA LOSS WHILE HANDLING ERRORS DETECTED DURING RECOVERY

(75) Inventors: Jeffrey William Josten, San Jose, CA (US); Laura Michiko Kunioka-Weis, Morgan Hill, CA (US); Thomas Majithia, San Jose, CA (US); Haakon Philip Roberts, Hook (GB); James Zu-Chia Teng, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 335 days.

(21) Appl. No.: 11/219,409

(22) Filed: Sep. 2, 2005

(65) Prior Publication Data
US 2007/0055687 A1    Mar. 8, 2007

(51) Int. Cl.
*G06F 17/30* (2006.01)
(52) U.S. Cl. .................. 707/202; 707/200; 707/204
(58) Field of Classification Search .................. 707/200, 707/202, 204
See application file for complete search history.

(56) References Cited

U.S. PATENT DOCUMENTS

| 4,750,106 | A | 6/1988 | Aiken, Jr. ................. 364/200 |
| 4,945,474 | A | 7/1990 | Elliott et al. ............... 364/200 |
| 5,724,581 | A * | 3/1998 | Kozakura .................. 707/202 |
| 6,449,623 | B1 | 9/2002 | Bohannon et al. .......... 707/202 |
| 6,732,124 | B1 | 5/2004 | Koseki ...................... 707/202 |
| 6,874,010 | B1 * | 3/2005 | Sargent .................... 709/203 |
| 7,143,120 | B2 * | 11/2006 | Oks et al. .................. 707/202 |
| 2003/0036882 | A1 | 2/2003 | Harper et al. .............. 702/186 |

* cited by examiner

*Primary Examiner*—Baoquoc N To
(74) *Attorney, Agent, or Firm*—Kunzler & McKenzie

(57) ABSTRACT

A system, method a computer usable storage medium tangibly embodying a program of instructions executable by the computer to perform a computer-based method for restoration of a database from a failed data recovery. For each failed data recovery the method generates a log error data set having log records of a faulty transaction unapplied to data due to inconsistency. Log error data set is directly useable by a log analysis tool to regenerate and redo the unapplied faulty transaction to recover the data and by a print log tool to diagnose the faulty transaction. Log records mimic format of records of an archive log data set and identify data objects, faulty transactions on the data objects and a range of the unapplied data objects' updates.

20 Claims, 3 Drawing Sheets

SYSTEM AND METHOD FOR MINIMIZING DATA OUTAGE TIME AND DATA LOSS WHILE HANDLING ERRORS DETECTED DURING RECOVERY

BACKGROUND OF THE INVENTION

1. Field of the Invention

This invention relates in general to database management systems performed by computers, and in particular to an optimized method and system for minimizing data outage time and data loss while handling errors detected during data recovery.

2. Description of Related Art

Databases are computerized information storage and retrieval systems. A Relational Database Management System (RDBMS) is a database management system (DBMS) which uses relational techniques for storing and retrieving data. RDBMS software using a Structured Query Language (SQL) interface is well known in the art. The SQL interface has evolved into a standard language for RDBMS software and has been adopted as such by both the American National Standards Organization (ANSI) and the International Standards Organization (ISO).

A typical relational database management system includes both database files and index files. The database files store data in the rows and columns of tables stored on data pages while index keys, used for faster reference of the data, are stored on index pages. A page is a physical unit of transfer between main storage and secondary storage. In such a table, the rows may correspond to individual records while the columns of the table represent attributes of the records. For example, in a customer information table of a database management system, each row might represent a different customer data object while each column represents different attributes of the customers, such as the name of a particular customer, the amount owed by the customer and the cash receipts received from the customer. The actions of a transaction that cause changes to recoverable data objects are recorded in a log file or data set.

Generally, many transaction processing systems, Data Base Management Systems and application programs have a need for enhanced transaction control for databases. Transaction control is well understood in the art and is often used to guarantee the integrity of enterprise databases. Guaranteeing the integrity of databases in the face of concurrent execution of multiple transactions and various failures is a very important issue with enterprise databases. Indeed, many methods have been developed in the past to deal with these problems for enterprise databases. Specifically, one such method, utilized in many transaction processing systems, database management systems and applications includes an efficient technique for DB2 database data recovery described below.

Area of integrity constraints remains of great concern in providing for recovery of database data because a vast amount of time and money is associated with the compilation of data resident in the database. Moreover, users have fear of losing data because of the great dependence which they have on their increasingly vital database resources. Thus, a general approach used in most database systems provides for redundancy by creating backup copies of the data for the event of database reconstruction and tracks transactions/operations in log files so that transactions can be rolled back and rerun after an error in the same order as the original set of transactions.

Many DBMS, such as the DB2, have utilities for detecting corrupted data and transactions and recovery utilities for recovery from corruption. They log the transactions and recover data objects and restore them in a database to an uncorrupted state after a software or hardware error. One exemplary utility is the Recover Utility for DB2 UDB for z/OS which uses log records of applications' or DBMS' transactions which are stored in log data sets, files or journals so that the transactions can be redone from the log records. Ranges of updates to the data objects are kept track of in a log range table in order to limit the amount of log records read during recovery. DB2 UDB for z/OS Recover Utility recovers an object or a list of objects by restoring the copy of each such data object from an image copy, usually saved during a regular data backup of objects from tablespaces and indexspaces. It then applies to the appropriate data or index pages the saved transactions from the log records in order to redo the transactions, such as inserts/updates/deletes, that may have occurred since the image copy was taken.

The log records are read from the active log data sets and the archive log data sets which may reside on magnetic tape devices or disk drives. In a data sharing multi-process, the log records must be read from each system separately and merged in sequence with log records from the other shared DB2 systems before they can be applied to redo inserts/updates/deletes on the data or index pages. The reading, which is done serially within each system, and the merging of the log records can be a time consuming process.

During the application of the log records to data or index pages in the recovery process, error checking is performed in order to ensure that data integrity is preserved. If it is determined that applying a log record to a data or index page will make the data inconsistent, the log record and all subsequent log records that update this data or index page are not applied. Instead, an error message is issued and a problem determination action has to be performed. Thus, a dump for each data or index page that encountered an error during log apply is saved and all these data or index pages are flagged with an "inconsistent" status so that the data on the flagged pages are made inaccessible by the users during this data outage time.

The problem determination actions, performed after the error determination, are time extensive which can make the data on the flagged pages inaccessible for an extended time period. Presently, these actions include contacting an IBM Support Center to perform a manual problem determination on received dump(s) by analyzing the dump(s) to determine which log record(s) could not be applied and why. Analyzing the dump(s) requires in-depth knowledge of the internal processes of DB2 and requires time to locate ranges of the problematic log record(s) that could not be applied to the image copy. Once these ranges have been determined, a print log tool must be used to print the contents of the log records either at the customer site or at the IBM Support Center. It is preferable for the log data sets to be sent in by the customer so that the IBM Support Center personnel can run the print log tool and analyze the output. In that case, for DB2 systems with a high workload, a large number of active and archive log data sets must be sent in, and thus the number of log records read from the log data sets and merged by the print log tool, in the data sharing case, could be tremendous, resulting in a prolonged run time for the print log tool.

The print log tool must be run for each data object that encountered an error separately, since it can only print the log records for one object at a time. Moreover, the run time for the print log tool can also be adversely affected if the log data sets reside on a magnetic tape device which has slower access than memory or hard disks. Further, based on the results of the log records' analysis, the customer must manually build the SQL statements to redo on the flagged data or index pages the inserts/updates/deletes that have occurred since the image copy was taken.

It is possible that, due to the volume of log records that must be analyzed, it is not feasible to manually build the SQL statements to redo the missing work. In cases like these the customers can sometimes choose other alternatives, such as restoring the data from a cloned system or even choosing to lose some of their data. Some customers have a log analysis tool to scan and analyze log records and build the SQL statements to redo the work that has been lost, by redoing the inserts/updates/deletes on flagged data or index pages that have occurred since the image copy was taken. However, in conventional systems the log analysis tool has to read and merge the log records from the active and archive log data sets, which could result in a prolonged run time. Moreover, a log analysis tool needs to start the log scan at a point of an image copy, as opposed to using the first log record that encountered an error, so more log records have to be read and analyzed than are actually needed, which also prolongs the run time.

The main drawback of the conventional recovery systems' approach, documented above, is the extended time period where the data from the flagged pages is not available due to the complexity of problem determination and the prolonged execution time of the tools run against the log data sets. In these systems the active and archive log data sets must be read multiple times, once during the recovery process and once for each data object that encountered an error, during the procedure to recover the data from unapplied, problematic log records.

Therefore, there is a need for a simple, optimized and method which can handle errors discovered during data recovery process more efficiently in order to minimize data outage time and data loss and which can automatically recover and restore the data objects from unapplied, problematic log records.

SUMMARY OF THE INVENTION

The foregoing and other objects, features, and advantages of the present invention will be apparent from the following detailed description of the preferred embodiments, which makes reference to several drawing figures.

One preferred embodiment of the present invention is a computer-based method for restoration of a database from a failed data recovery. For each failed data recovery the method generates a log error data set having log records of a faulty transaction unapplied to data due to inconsistency. Log error data set is directly useable by a log analysis tool to regenerate and redo the unapplied faulty transaction to recover the data and by a print log tool to diagnose the faulty transaction. Log records mimic format of records of an archive log data set and identify data objects, faulty transactions on the data objects and a range of the unapplied data objects' updates.

Another preferred embodiment of the present invention is a system implementing the above-mentioned method embodiment of the present invention.

Yet another preferred embodiment of the present invention includes a computer usable medium tangibly embodying a program of instructions executable by the computer to perform method steps of the above-mentioned method embodiment of the present invention.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description of the preferred embodiments reference is made to the accompanying drawings, which form the part thereof, and in which are shown by way of illustration specific embodiments in which the invention may be practiced. It is to be understood that other embodiments may be utilized and structural and functional changes may be made without departing from the scope of the present invention.

The present invention discloses a system, method and computer usable storage medium, tangibly embodying a program of instructions executable by a processor to perform method steps of the present invention, for minimizing data outage time and data loss while handling errors detected during data recovery. The present invention is directed to an enhanced recovery utility which saves the unapplied log records of transactions' actions into a novel data set named a log error data set. The enhanced recovery utility is applicable to many DBMS recovery processes and tools and utilized whenever the transaction/activity log records are logically corrupted in order to correct inconsistencies in stored data objects by using log records from this novel log error data set.

Figure 1:
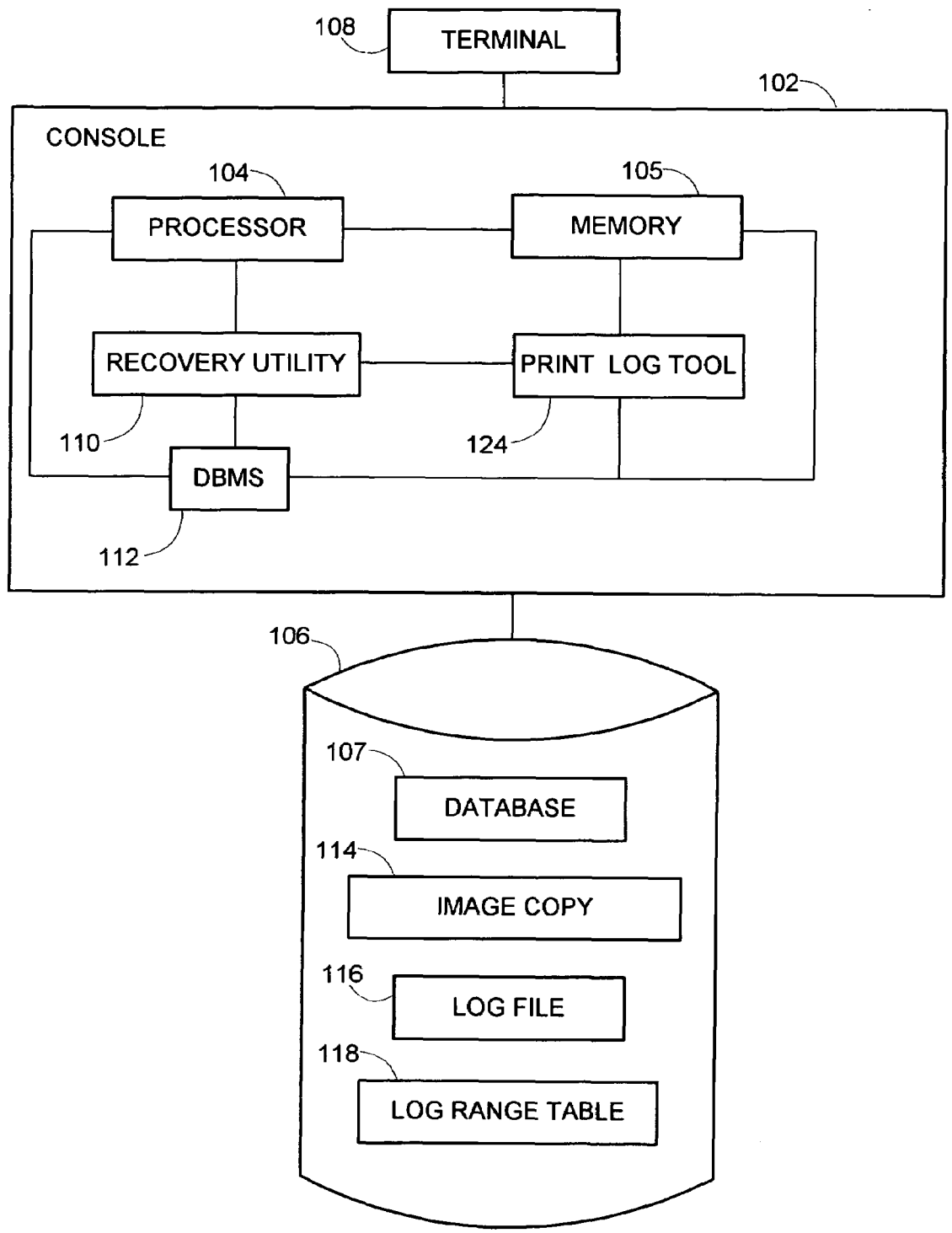
FIG. 1 illustrates a computer hardware and software environment according to the prior art.
Figure 2:
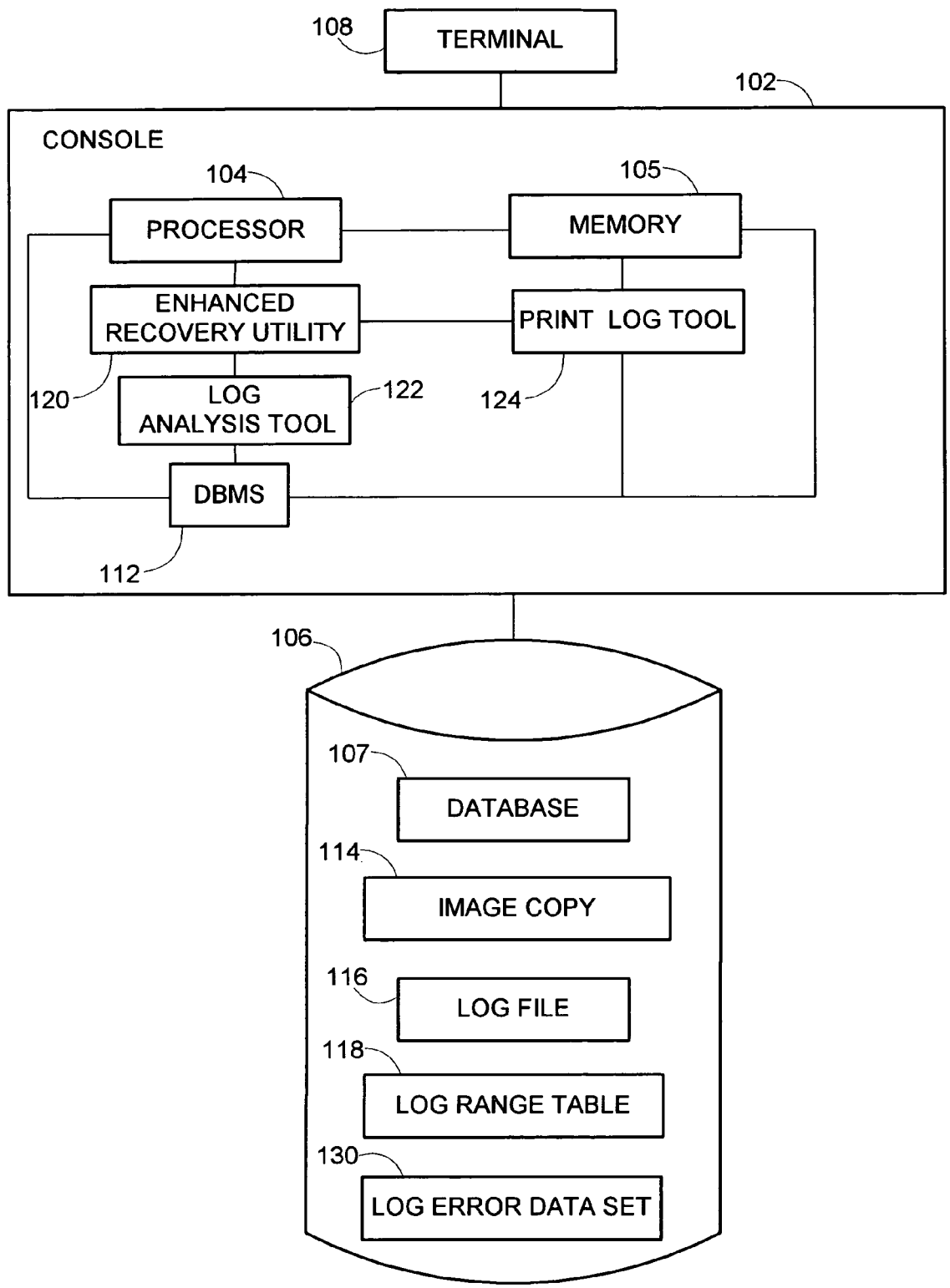
FIG. 2 illustrates a computer hardware and software environment enabling data recovery, according to the preferred embodiments of the present invention.

FIG. 1 illustrates an exemplary computer hardware and software environment usable by the prior art. FIG. 2 illustrates an exemplary computer hardware and software environment usable by the preferred embodiments of the present invention to enable the enhanced data recovery and creation of a log error data set. FIGS. 1-2 include a console 102 having one or more conventional processors 104 executing instructions stored in an associated computer memory 105 and a console terminal 108. The memory 105 can be loaded with instructions received through an optional storage drive or through an interface with a computer network.

The processor 104 is connected to one or more electronic storage devices 106, such as disk drives, that store one or more relational databases 107. They may comprise, for example, optical disk drives, magnetic tapes and/or semiconductor memory. Each storage device permits receipt of a program storage device, such as a magnetic media diskette, magnetic tape, optical disk, semiconductor memory and other machine-readable storage device, and allows for method program steps recorded on the program storage device to be read and transferred into the computer memory. The recorded program instructions may include the code for the method embodiments of the present invention. Alternatively, the program steps can be received into the operating memory from a computer over the network.

Operators of the console terminal 108 use a standard operator terminal interface (not shown), to transmit electrical signals to and from the console 102, that represent commands for performing various tasks, such as search and retrieval functions, termed queries, against the database 107 stored on the electronic storage device 106. In the present invention, these queries conform to the Structured Query Language (SQL) standard, and invoke functions performed by a DataBase Management System (DBMS) 112, such as a Relational DataBase Management System (RDBMS) software. In the preferred embodiments of the present invention, the RDBMS software is the DB2 product, offered by IBM for the AS400, OS390 or OS/2 operating systems, the Microsoft Windows operating systems, or any of the UNIX-based operating systems supported by the DB2. Those skilled in the art will recognize, however, that the present invention has application to any RDBMS software that uses SQL, and may similarly be applied to non-SQL queries. The electronic storage device 106 further includes an image copy 114, a log file 116 and a log range table 118. FIG. 1 further illustrates a software environment of the prior art, where the console includes a recovery utility 110 and a print log tool 124.

FIG. 2 illustrates a software environment which enables the preferred embodiments of the present invention. In the system shown in FIG. 2 the console includes an enhanced computer-based recovery utility 120 which incorporates a method for creating a log error data set 130, according to the preferred aspects of the present invention, and for saving it in the electronic storage device 106. The enhanced recovery utility 120 module preferably uses two tools located in the console 102: an automated log analysis tool 122 used during the recovery and a print log tool 124 useable for further problem determination, if needed.

The log error data set 130 can be utilized manually for a problem diagnosis to shorten the problem determination actions. However, in the preferred aspects of the present invention it is utilized by the automated log analysis tool 122 to regenerate the unapplied transactions, such as SQL statements, from the unapplied log records in order to redo these unapplied transactions and recover the missing data. The log error data set 130, which contains logically corrupted log records that could not be applied, can also be used as an input into the log print tool 124 for creation of a printout useable for an additional problem determination, if required at a later time. The system and method of the present invention thus create a log of logically corrupted log records only containing the failed redo operations which was unavailable to the prior art recovery utility 110 algorithm.

Figure 3:
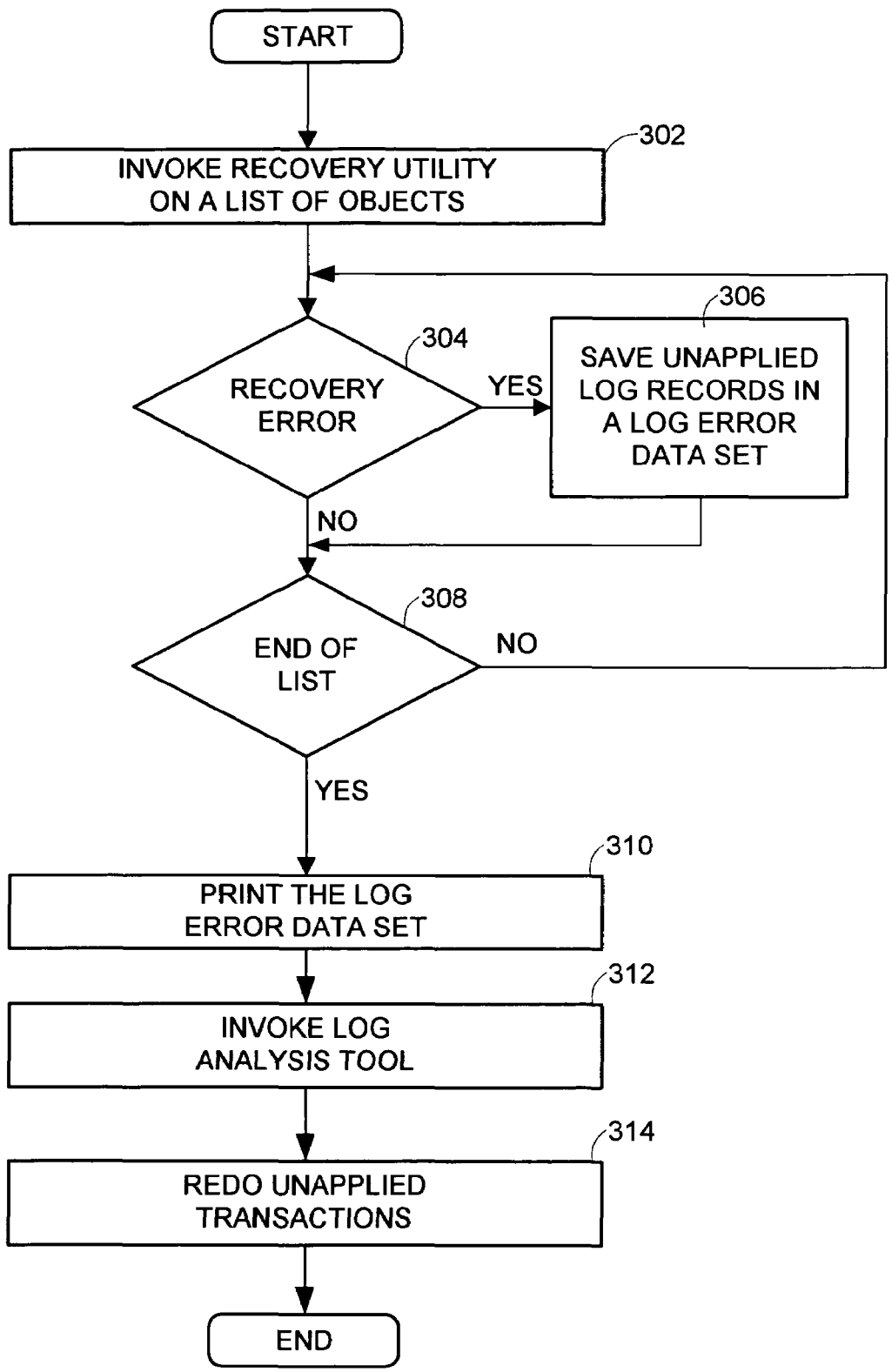
FIG. 3 illustrates a flowchart of a computer-based method performing the enhanced recovery, according to the preferred embodiments of the present invention.

FIG. 3 illustrates a flowchart of a computer-based method performing the enhanced recovery, according to the preferred embodiments of the present invention. When the enhanced recovery utility 120 process is invoked on a list of objects, in step 302 of FIG. 3, the application of log records from the log file 116 is done in one pass on all of the objects from the list. Any error encountered in step 304 during the application of log records results in the unapplied log records being saved in the log error data set 130, in step 306. The content of the log error data set 130 identifies for each data object the redo transactions that were not recovered and the range of the unapplied updates. This process continues until the end of the list is detected in step 308.

Saving the log records that could not be applied during the recovery process into the log error data set 130 eliminates the need to separately identify the range of problematic, unapplied log records. Further, it removes the need to read and merge the log records from the active and archive log data sets multiple times, as presently performed by conventional systems of FIG. 1, since the log error data set 130 can be used as a direct input to the log analysis tool 122, in step 312, or to the print log tool 124, in step 310, and thus does not require use of the active and archive log data sets 116 of the prior art. This decreases a volume of log records to be read by the print log tool 124 and log analysis tool 122 since they no longer need to scan log records starting with a certain point of the image copy 114. With these advantages, the time needed for problem diagnosis and for recovery of the data is minimized, and the data can be made available to the customer sooner. Moreover, it usually eliminates the unfortunate cases of data loss because the volume of log records is almost never too large to be manually analyzed and it can now be handled properly with the log analysis tool 122, which minimizes the data recovery time experienced by the customers.

The enhanced recovery utility 120 aspect of the present invention is executed as an enhanced process which writes into the log error data set 130 the log records that could not be applied due to a hardware or software error. In one aspect of the present invention the recovery process invokes a separate task for writing the log records into the log error data set 130. This method has the advantage because it can be applied in log application processes that operate either in parallel or serially. In the serialized log application process, a single process is applying log records to different data objects and it invokes the task of writing the log records to the log error data set 130. In the parallel log application process, where log records are being applied to different objects at the same time, multiple processes invoke the task for writing the log records to the log error data set 130 concurrently and thus no merger of log records is required.

Preferable format of the log error data set 130 mimics the format of an archive log data set 116 so that the print log tool 124 and the log analysis tool 122 can accept the log error data set 130 as their direct input with only minimal changes to these tools. Thus, the log error data set 130 record contains information about transactions and data, such as a file name, record Id, old record value, new record value, transaction Id, database operation Id, timestamp, log record length, pointer to a previous log record of each transaction, etc.

In the preferred aspect of the present invention, the process of data recovery is completed in step 312 by invoking the log analysis tool 122 which accepts the log error data set 130 as its direct input. The log analysis tool 122 reads the log records from the log error data set 130 and reads the data from the flagged data or index pages of the database 107 directly, without the use of the image copy 114 of the prior art, in order to generate the SQL statements needed to recover the missing data. Finally, in step 314, the rebuilt SQL statements are applied to redo the work that has been lost, by redoing on the flagged data or index pages the inserts/updates/deletes that have occurred since the image copy was taken. If additional problem determination is needed, the print log tool 124 accepts the log error data set 130 in step 310 as a direct input and prints and/or formats the log records so that they can be analyzed by the IBM Support Center personnel.

Thus, the log error data set 130 can be used by subsequent processes to rebuild/regenerate or retrieve the data, to aid in problem diagnosis of a cause of the log records inapplicability or to print the log records for diagnostic purposes. Saving the unapplied log records in a separate, log error data set 130 results in a decreased outage time for the customer since the log records are retrieved from a smaller file, the log error data set 130, rather than from the actual archived log files 114 of prior art which can be very large and archived to a slow secondary storage device, such as magnetic tape drives.

The present invention is broadly applicable to all DBMS recovery processes and tools, for all database applications and DBMS tools vendors. It is presently being implemented in the DB2 UDB product for z/OS and is preferably used for developing applications for DB2 machines. However, the technology may be applied to any other database manager products, such as Oracle, Informix, Sybase, SQL Anywhere, and Microsoft SQL Server, and other relational products. The method and system of the present invention may be used in a distributed computing environment in which two or more computer systems are connected by a network, such as the World Wide Web, including environments in which the networked computers are of different type.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for facilitating restoration of a database from a data recovery comprising one or more transactions that fail during recovery, the database maintained by a physical processor communicating with a memory module, the method comprising:
   initializing a data recovery comprising one or more transactions that fail during recovery;
   detecting the one or more transactions that fail during the data recovery;
   generating a log error data set during the data recovery comprising log records of each of the one or more failed transactions unapplied to data due to logical inconsistency, the log records configured to identify data objects, to identify the failed transactions on the data objects and to identify a range of the unapplied updates of the data objects; and
   generating recovery SQL statements, the recovery SQL statements configured to automatically redo the unapplied failed transactions referenced in the log error data set, wherein a user applies the generated recovery SQL statements to complete the data recovery once the inconsistency is resolved.

2. The method according to claim 1, wherein the log error data set is useable by a log analysis tool to regenerate and redo the unapplied failed transaction to recover the data.

3. The method according to claim 1, wherein the log error data set is useable by a print log tool to print log records.

4. The method according to claim 1, wherein the log records mimic format of records of an archive log data set.

5. The method according to claim 1, wherein the method is incorporated in a DB2 product.

6. The method according to claim 1, wherein the log error data set is useable to diagnose cause of the data recovery comprising transactions that fail, to regenerate and retrieve data.

7. The method according to claim 1, wherein the log error data set is useable in a distributed computing environment.

8. The method according to claim 1, wherein multiple processes concurrently save the log records in the log error data set in a parallel log application process environment.

9. A computer usable storage medium tangibly embodying a program of instructions executable by the computer to perform operations for facilitating restoration of a database from a DB2 data recovery comprising transactions that fail during recovery, the database maintained by a physical processor communicating with a memory module, the operations comprising:
   initializing a data recovery comprising one or more transactions that fail during recovery;
   detecting the one or more transactions that fail during the DB2 data recovery;
   generating a log error data set during the data recovery comprising log records of each of the one or more failed transactions unapplied to data due to logical inconsistency, the log records configured to identify data objects, to identify the failed transactions on the data objects and to identify a range of the unapplied updates of the data objects; printing the log error data set with a print log tool;
   generating recovery SQL statements, the recovery SQL statements configured to automatically redo the unapplied failed transactions referenced in the log error data set, wherein a user applies the generated recovery SQL statements to complete the DB2 data recovery once the inconsistency is resolved.

10. The computer useable storage medium according to claim 9, wherein the log error data set is useable by a log analysis tool to regenerate and redo the unapplied failed transaction to recover the data.

11. The computer useable storage medium according to claim 9, wherein the log records mimic format of records of an archive log data set.

12. The computer useable storage medium according to claim 9, wherein the log error data set is useable to diagnose cause of the data recovery comprising transactions that fail during recovery, to regenerate and retrieve data.

13. The computer useable storage medium according to claim 9, wherein the log error data set is useable in a distributed computing environment.

14. The computer useable storage medium according to claim 9, wherein multiple processes concurrently save the log records in the log error data set in a parallel log application process environment.

15. A system for restoring a database from a data recovery comprising one or more transactions that fail during recovery, comprising:
   a database maintained by a physical processor communicating with a memory module;
   a database management system (DBMA) configured to
      initialize a data recovery comprising one or more transactions that fail during recovery;
   a recovery utility configured to
      detect the one or more transactions that fail during the data recovery;
      generate a log error data set during the data recovery comprising log records of each of the one or more failed transactions unapplied to data due to logical inconsistency, the log records configured to identify data objects, to identify the failed transactions on the data objects and to identify a range of the unapplied updates of the data objects; and
      generate recovery SQL statements, the recovery SQL statements configured to automatically redo the unapplied failed transactions referenced in the log error data set, wherein a user applies the generated recovery SQL statements to complete the data recovery once the inconsistency is resolved.

16. The system according to claim 15, wherein the log error data set is useable by a print log tool to print log records.

17. The system according to claim 15, wherein the log records mimic format of records of an archive log data set.

18. The system according to claim 15, wherein the system is incorporated in a DB2 product.

19. The system according to claim 15, wherein the log error data set is useable to diagnose cause of the data recovery comprising one or more transactions that fail during recovery, to regenerate and retrieve data.

20. The system according to claim 15, wherein multiple processes concurrently save the log records in the log error data set in a parallel log application process environment.

* * * * *